(12) United States Patent
Yamashita et al.

(10) Patent No.: US 7,177,103 B2
(45) Date of Patent: Feb. 13, 2007

(54) OPTICAL LENS ADJUSTING DEVICE AND ADJUSTING METHOD THEREOF

(75) Inventors: Tatsumaro Yamashita, Miyagi-ken (JP); Hitoshi Yoshiyuki, Miyagi-ken (JP); Masamichi Hayashi, Miyagi-ken (JP); Eiki Matsuo, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 48 days.

(21) Appl. No.: 11/182,708

(22) Filed: Jul. 15, 2005

(65) Prior Publication Data

US 2006/0028742 A1 Feb. 9, 2006

(30) Foreign Application Priority Data

Aug. 6, 2004 (JP) .............................. 2004-231309

(51) Int. Cl.
*G02B 7/02* (2006.01)
(52) U.S. Cl. ..................................... 359/822; 359/813
(58) Field of Classification Search ................ 359/694, 359/696, 697, 704, 818, 819, 822, 823, 813; 396/72, 93, 106

See application file for complete search history.

(56) References Cited

U.S. PATENT DOCUMENTS

| 5,630,180 A | * | 5/1997 | Kusaka ......................... 396/63 |
| 6,661,589 B2 | * | 12/2003 | Takanashi et al. .......... 359/819 |
| 2003/0044176 A1 | | 3/2003 | Saitoh ......................... 396/72 |

* cited by examiner

*Primary Examiner*—Ricky Mack
*Assistant Examiner*—M. Hasan
(74) *Attorney, Agent, or Firm*—Beyer, Weaver & Thomas, LLP.

(57) ABSTRACT

When a voltage is applied between outside electrodes and a common electrode that constitute driving parts of a driving unit provided between a holder holding a lens and a lens barrel, as shown in FIG. 9, respective dielectric elastomers provided in the driving parts are slightly deformed in a direction that is crushed in an X1–X2 direction. Thus, the entire lens can be slightly moved in the direction of an arrow (X2-direction). This enables an optical axis O'—O' of the lens to coincide with or get closer to a reference optical axis.

12 Claims, 11 Drawing Sheets

FIG. 3
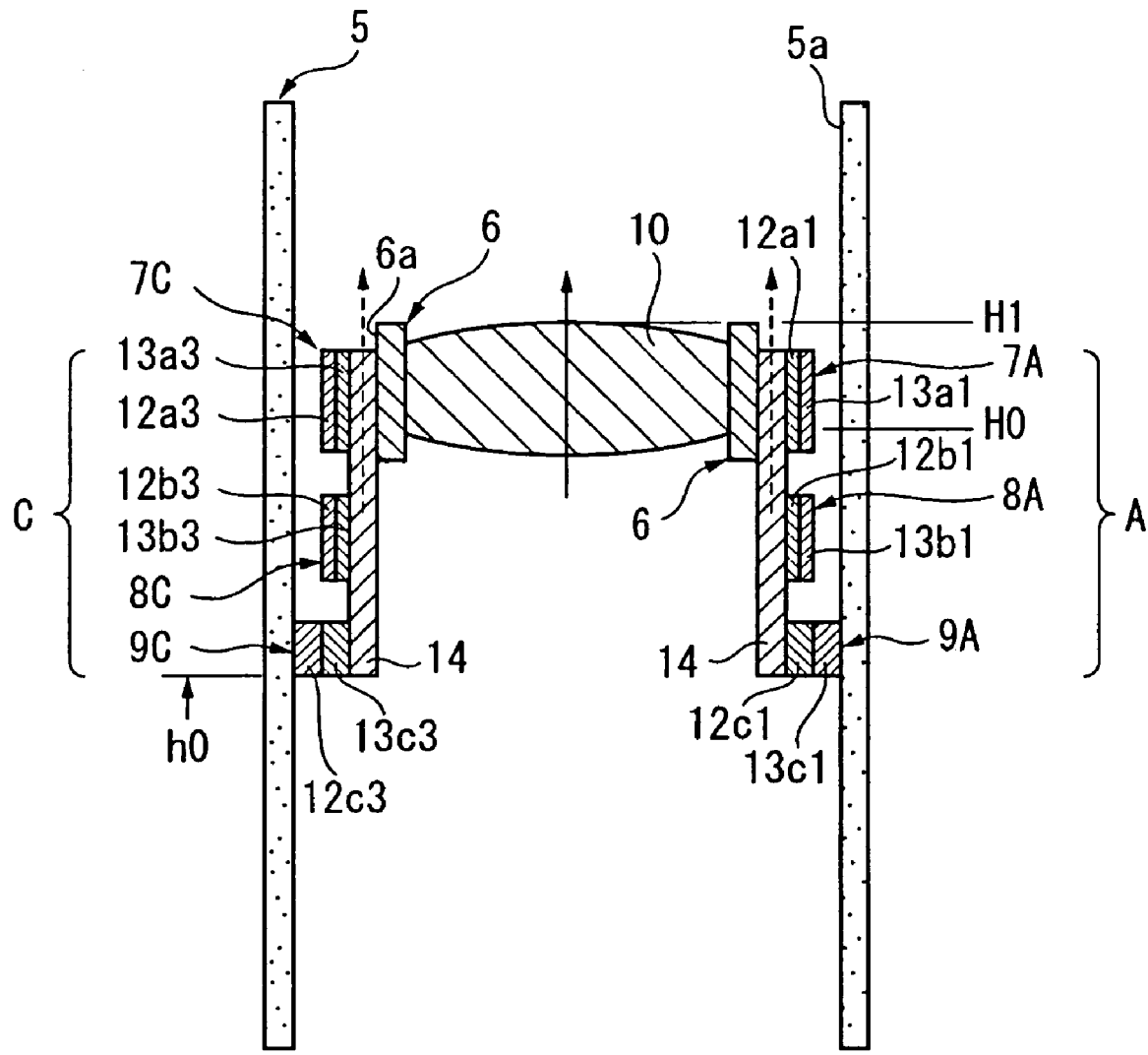
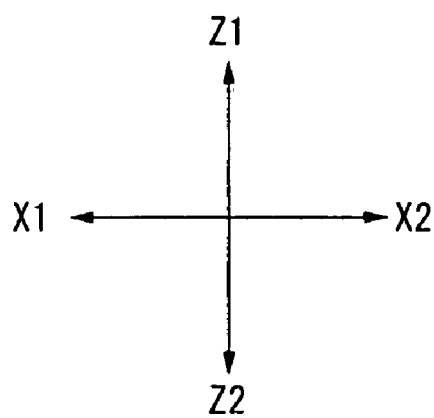

FIG. 6
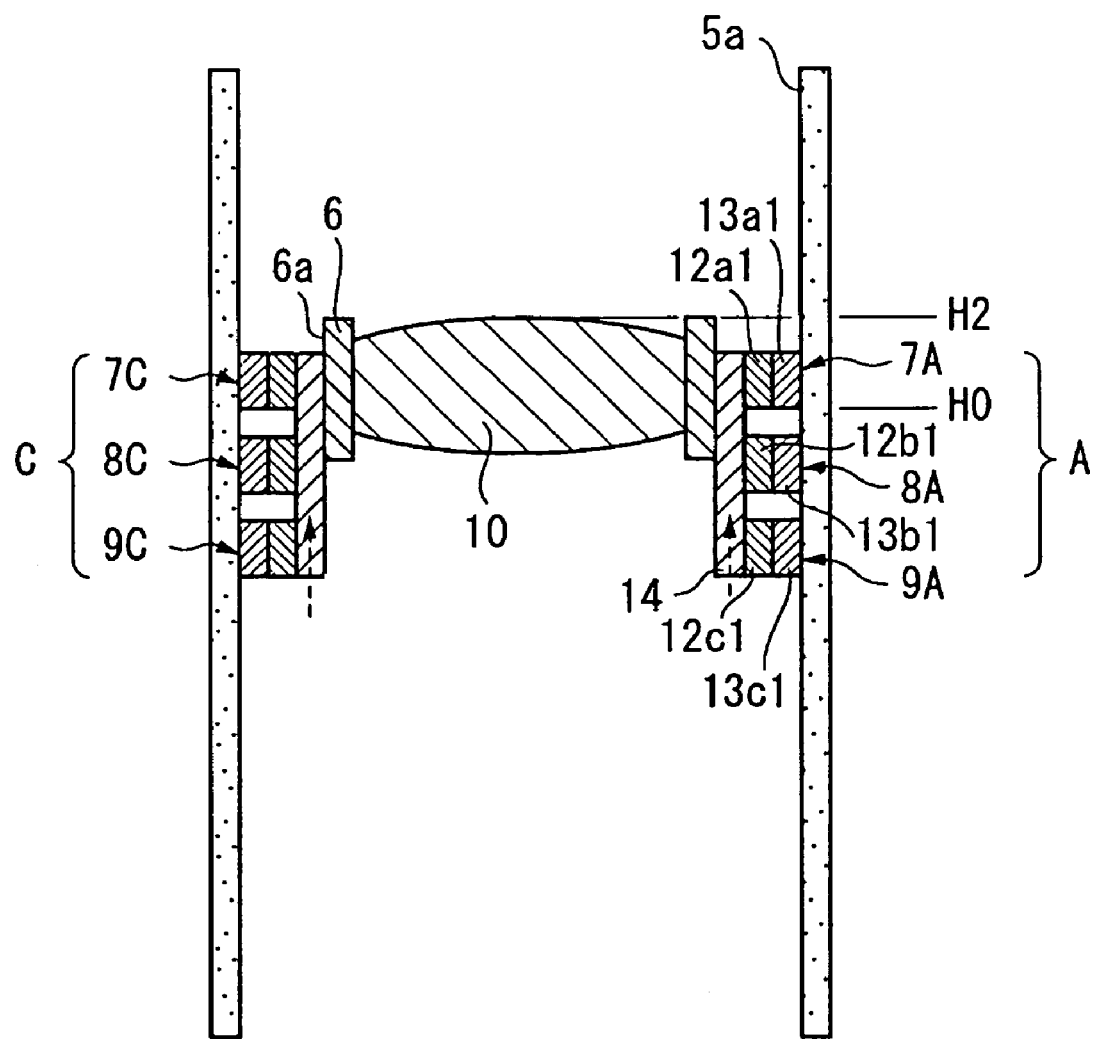
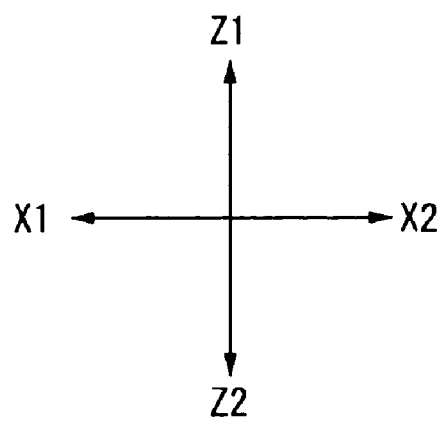

FIG. 7
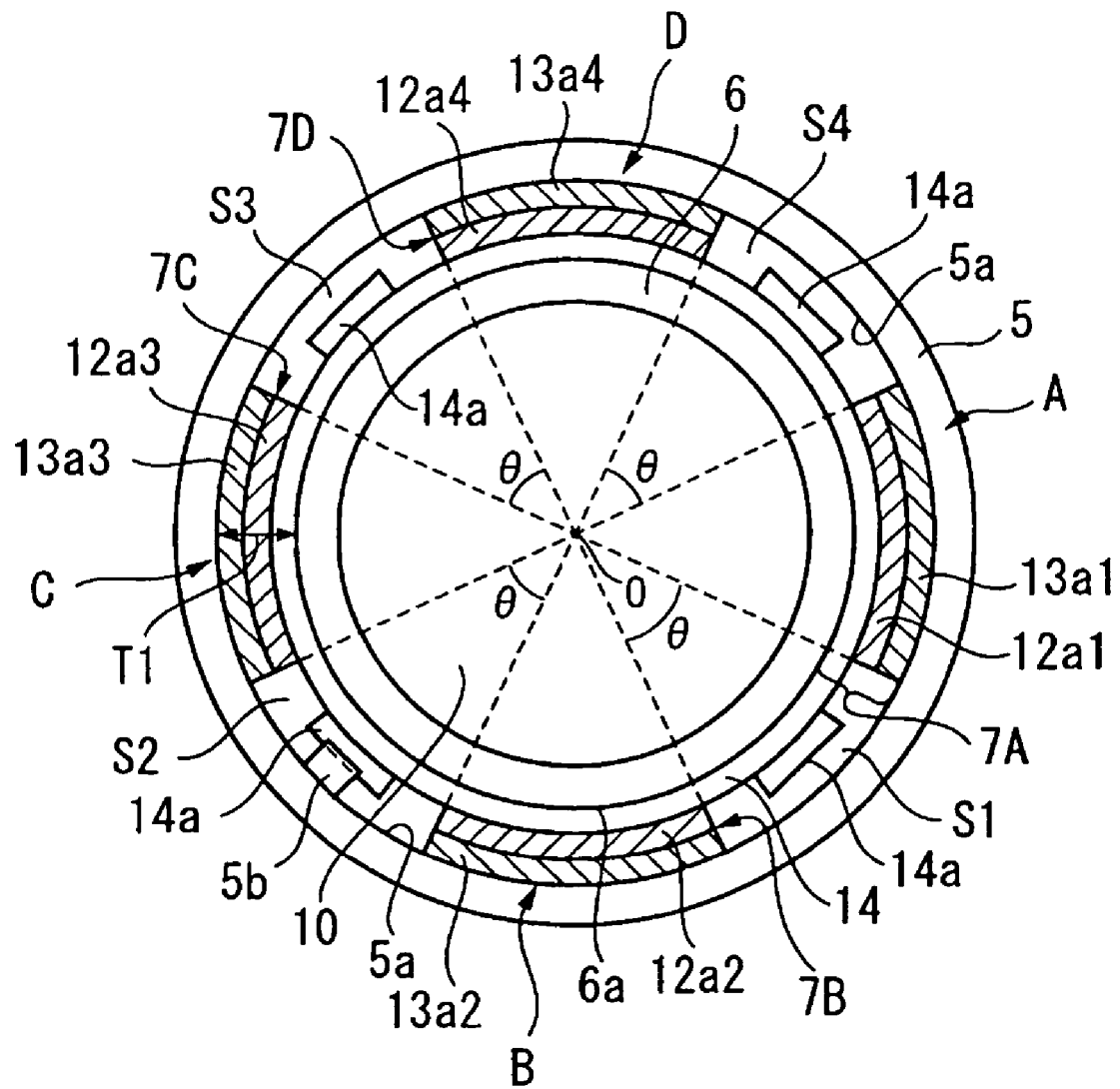
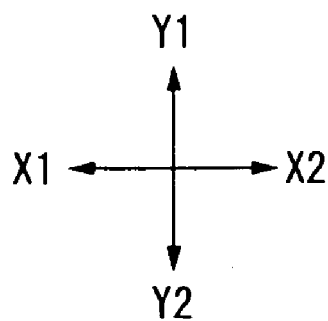

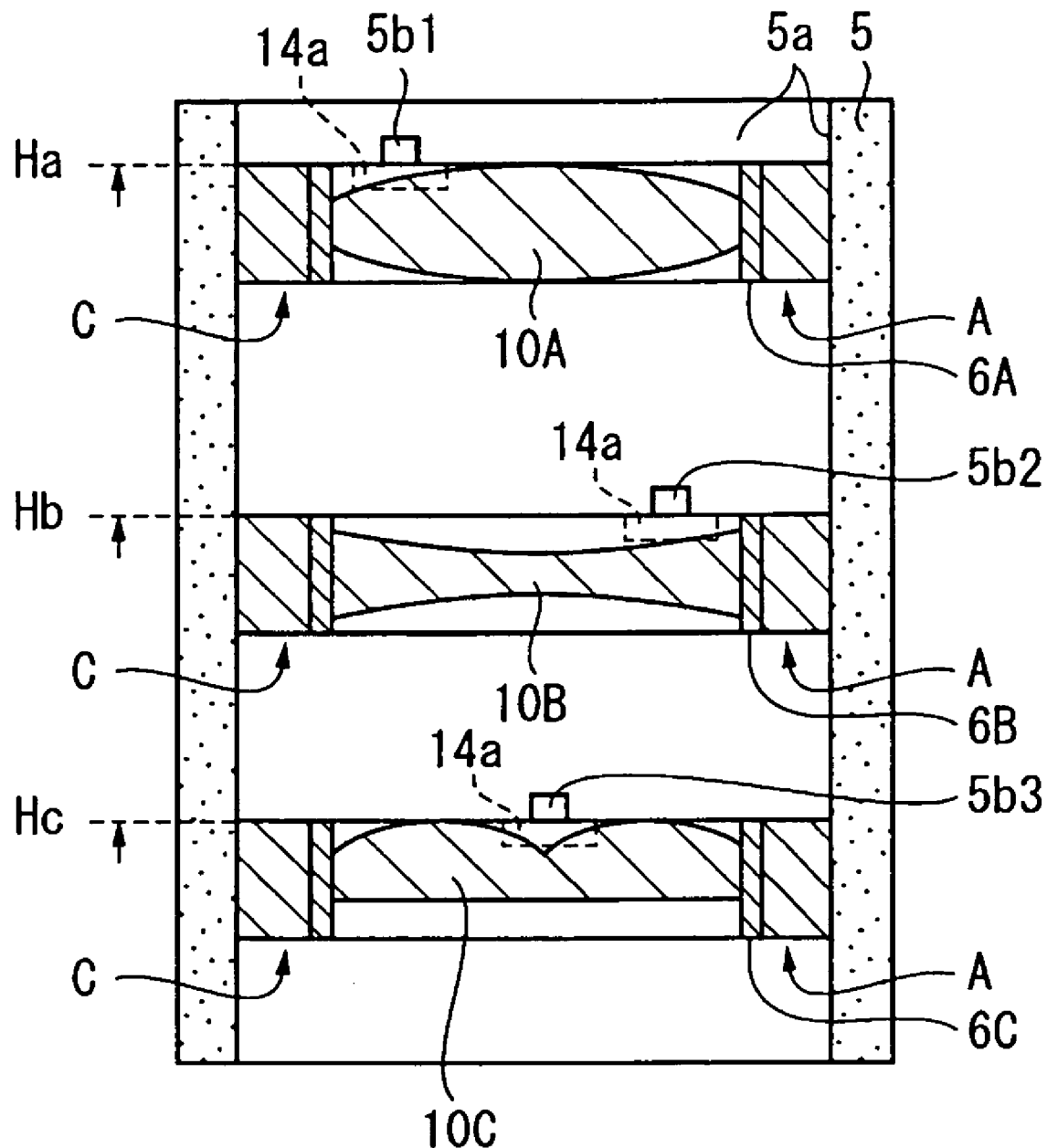

OPTICAL LENS ADJUSTING DEVICE AND ADJUSTING METHOD THEREOF

BACKGROUND OF THE INVENTION

1. Field of the Invention

The present invention relates to an optical lens adjusting device to be mounted on cameras or mobile telephones with a camera, etc. and an adjusting method thereof, and more specifically, to an optical lens adjusting device and an optical lens adjusting method which enables automatic adjustment in cameras.

2. Description of the Related Art

Prior-art technical literatures related to the invention include, for example, Japanese Unexamined Patent Application Publication No. 2003-66298 (hereinafter referred to as Patent Document 1). The invention disclosed in Patent Document 1 relates to an adjusting device of an optical axis of a photographing lens used for digital cameras, which enables the amount of eccentricity of the lens to be adjusted.

In the invention disclosed in Patent Document 1, a stationary lens L1 and an adjusting lens L2 is provided in a lens barrel, and when an X-Y micro-motion stage 47 is driven, a collect chuck 57 that holds the adjusting lens L2 is moved in a direction orthogonal to the optical axis. The optical axis of the adjusting lens L2 can be made coincide with the optical axis of the stationary lens L1.

However, the lens optical-axis adjusting device has a problem in that since the device is apt to be a complicated and large-scale device, the cost increases easily.

Further, generally, since cameras or mobile telephones with a camera have high convenience, they are readily put in a high temperature environment or a low temperature environment at all times. Also, since the lens barrel or the collect chuck 57 constituting the camera expands or contracts in such an environment, problems such as deviation of the optical axis of the lens or tilt of the lens per se easily occurs. Accordingly, conventionally, cameras or mobile telephones are shipped in state where the lens is fixed with adhesive, etc. so as not to move after the positional adjustment thereof. However, it is desirable to allow positional adjustment of the lens even after the shipment of cameras, etc.

Meanwhile, since the optical lens adjusting device disclosed in Patent Document 1 is a device in which adjustment of the optical axis is performed during assembling of the lens, adjustment of the optical axis in cameras after shipment should be performed by request for repair services.

Further, in the invention disclosed in Patent Document 1, the optical axis alignment is a task that is performed in a case where the optical axis of the adjusting lens L2 in the lens barrel deviates (deviation of the optical axis) and in the direction orthogonal to the optical axis of the stationary lens L1 in a state parallel to the optical axis of the stationary lens L1. Accordingly, in such a construction, it is not possible to perform the adjustment (inclination adjustment of the optical axis) in a case where the adjusting lens L2 is inclined within the lens barrel per se, and thereby the optical axis of the adjusting lens L2 is inclined with respect to the optical axis of the stationary lens L1.

Moreover, in a case where deviation occurs in the positional relationship between the stationary lens L1 and the adjusting lens L2 in the lens barrel, users should request a manufacturer to repair or adjust his/her camera or have no other means of buying new cameras again because the camera per se cannot be adjusted.

Furthermore, the above-described adjustment is currently performed manually except for the optical axis alignment.

SUMMARY OF THE INVENTION

The invention has been made in view of the conventional problems. It is therefore an object of the invention to provide an optical lens adjusting device and an adjusting method thereof which can automatically perform alignment and inclination adjustment of an optical axis of a lens, and adjustment of the positional relationship between lenses not only during assembling of lenses but also after shipment of lenses.

According to an aspect of the invention, an optical lens adjusting device is a device that performs adjustment of at least one or more lenses provided in a lens barrel. The optical lens adjusting device includes an actuator that actuates a lens in a first moving direction in which the lens barrel extends and in a second moving direction orthogonal to the first moving direction; an adjustment chart that can be placed at a position facing the lens and has a predetermined detection pattern; an image pickup device that is provided opposite to the adjustment chart with the lens therebetween to capture the adjustment chart as image data; an image processing means that outputs contrast values obtained by image-processing the image data captured by the image pickup device; a comparison operation means that compares the contrast values whenever the actuator; and a control means which causes the actuator to perform driving based on information from the comparison operation means.

In the optical lens adjusting device according to the aspect of the invention, the lens can be set at a certain position in a housing by driving the actuator in the first moving direction and in the second moving direction. Thus, for example, assembling of mounting the lens at a predetermined position in the housing can be performed automatically.

For example, the optical lens adjusting device may further include a storage means that stores an operating state of the actuator when one of the contrast values compared by the comparison operation means becomes greatest. The control means may control the actuator on the basis of set data for adjustment stored in the storage means to perform positional adjustment of the lens.

According to the above means, the position of the lens can be automatically performed even after its shipment.

In the above construction, preferably, a plurality of the actuators are provided between the outer periphery of the lens and the lens barrel, and the respective actuators are independently driven so that the lens can be moved in the first moving direction.

According to the above means, since only a portion of an outer peripheral portion of the lens can be adapted to be moved, particularly, the optical axis alignment or optical axis adjustment can be performed efficiently.

Specifically, when an imaginary line passing through the center of the image pickup device is used as a reference optical axis, the actuator may be driven so that the optical axis of the lens coincides with the reference optical axis.

Further, for example, a plurality of the lenses may be provided in the lens barrel, and the actuators may be driven so that a predetermined facing distance is set between the one lens and another lens.

In the above construction, the optical lens adjusting device may further include a holding means that holds the outer periphery of the lens, and the actuator may be provided between an internal surface of the lens barrel and the holding means.

Further, the actuator may be a driving means in which a plurality of driving parts are provided at predetermined intervals in the first moving direction, and each of the driving parts may use one that has a deformable dielectric elastomer, a pair of expandable and contractable electrodes which are arranged to face both sides of the dielectric elastomer, i.e., an artificial muscle.

In this case, one of the driving means which is located opposite to the side toward which the optical axis deviates is driven.

According to another aspect of the invention, an optical lens adjusting method using the optical lens adjusting device according to one of the optical lens adjusting device. The optical lens adjusting device includes the steps of acquiring set data for adjustment that sets an optical axis of a lens to a predetermined reference optical axis; and setting a state of the lens to an operating state based on the set data for adjustment read from the storage means immediately after power-on.

According to further still another aspect of the invention, an optical lens adjusting method is a method that performs adjustment of at least one or more lenses provided in a lens barrel. The optical lens adjusting means includes the steps of: setting a state of a lens to a different state on each occasion by driving an actuator provided with lens in a first moving direction in which the lens barrel extends and in a second moving direction orthogonal to the first moving direction; acquiring an image of an adjustment chart for every state of the lens with the image pickup device; obtaining contrast values by image-processing data about the image captured by the image pickup device; comparing the contrast values obtained whenever the image processing is performed on the data about the image; and driving the actuator so that one of the contrast values becomes greatest.

In this case, the step of acquiring the set data for adjustment may include the steps of: driving the actuator to the state of the lens to a different state on each occasion; imaging the adjustment chart on the image pickup device with lens; acquiring contrast values by image-processing data about an image captured by image pickup device; and comparing the contrast values acquired whenever the image processing is performed, on each occasion, to store an operating state showing a greatest contrast value as the set data for adjustment.

Moreover, preferably, in the step of driving the actuator, the actuator is driven so that the optical axis of the lens coincides with the reference optical axis.

BRIEF DESCRIPTION OF THE DRAWINGS

FIG. 1 is a perspective view showing the appearance of a digital camera having an optical lens adjusting device according to the invention, in which

FIG. 3 is a sectional view similar to FIG. 2, showing a first operation state as one of a series of basic operations of the optical lens adjusting device;

FIG. 6 is a sectional view similar to FIG. 2, showing a fourth operation state as one of a series of basic operations of the optical lens adjusting device;

FIG. 7 is a partial plan view of an actuator shown in FIG. 2, as viewed from above;

FIG. 8 is a sectional view similar to FIG. 2, showing a state where a plurality of lenses are provided in the lens barrel;

FIG. 9 is a sectional view similar to FIG. 2, showing a method of aligning an optical axis of a lens, in which

FIG. 10 is a sectional view similar to FIG. 2, showing a method of adjusting tilt of the optical axis of the lens, in which

DESCRIPTION OF THE PREFERRED EMBODIMENTS

Figure 1A:
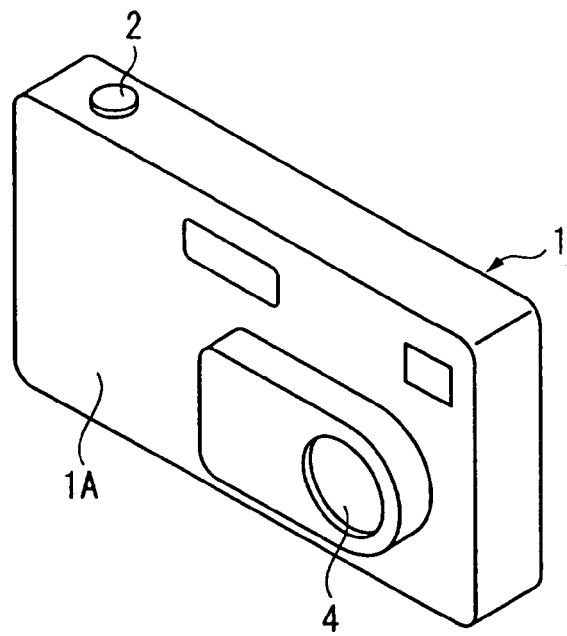
FIG. 1A shows an accommodated state where a lens barrel is accommodated within a camera body.
Figure 1B:
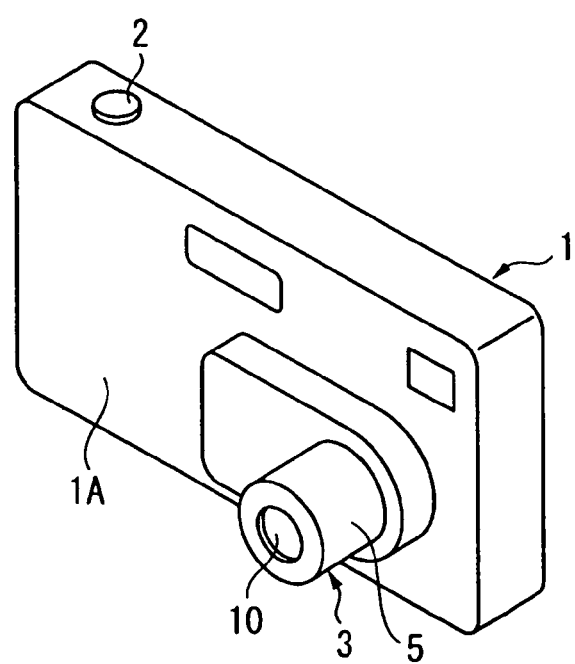
FIG. 1B shows a protruding state where a lens barrel protrudes out of the camera body.
Figure 2:
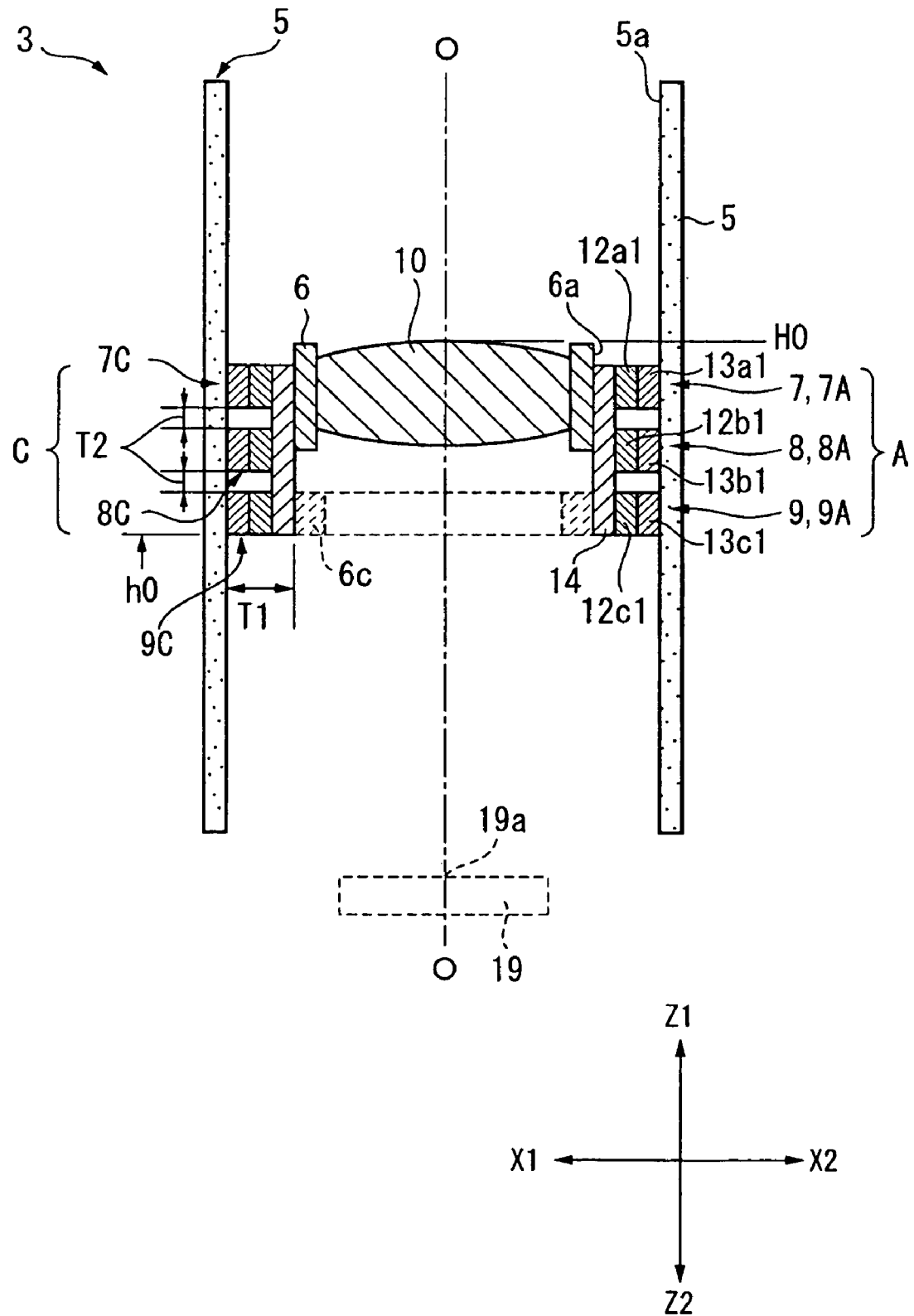
FIG. 2 is a sectional view showing an initial state of a lens barrel part as a component part of the optical lens adjusting device.
Figure 4:
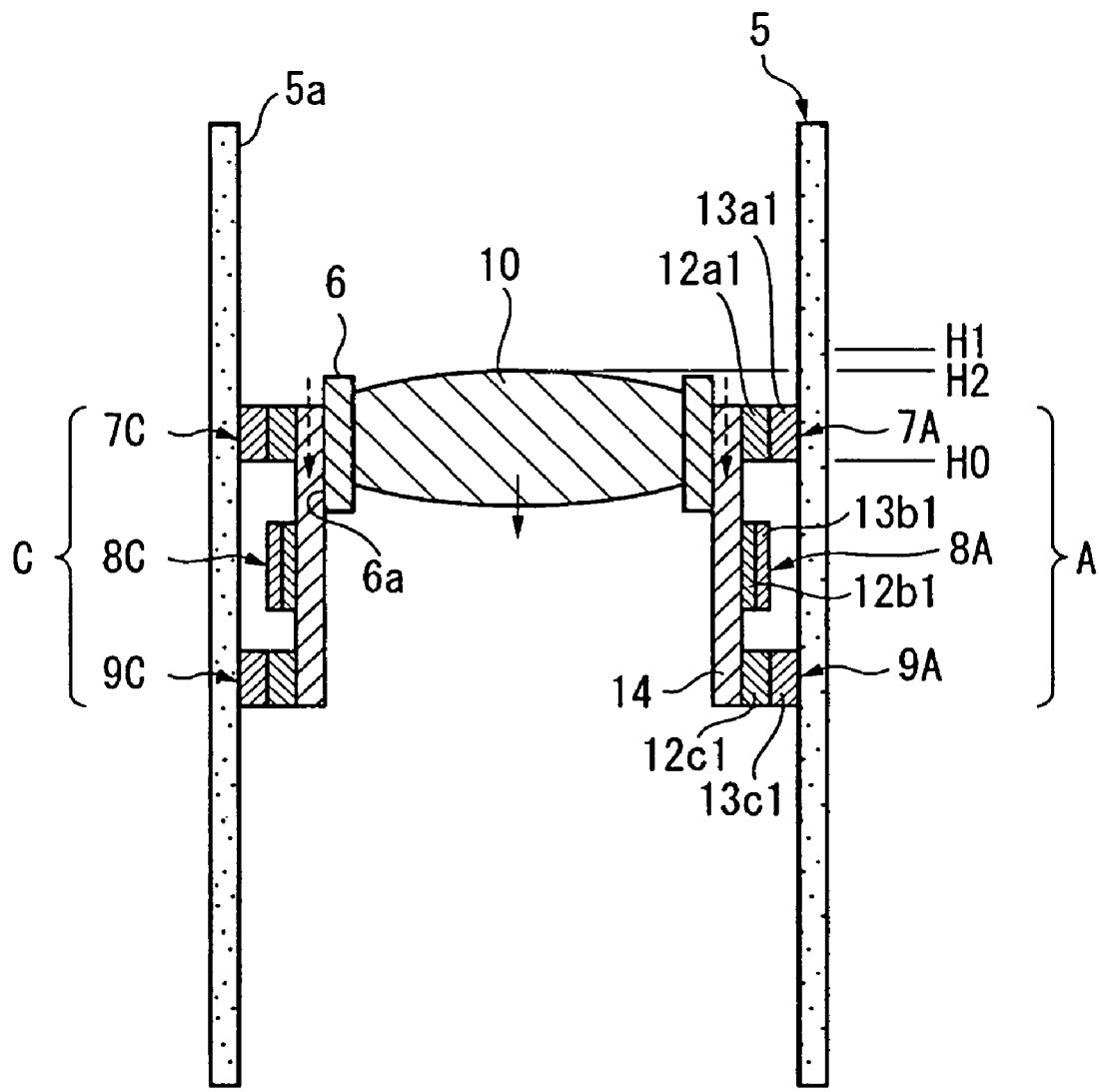
FIG. 4 is a sectional view similar to FIG. 2, showing a second operation state as one of a series of basic operations of the optical lens adjusting device.
Figure 5:
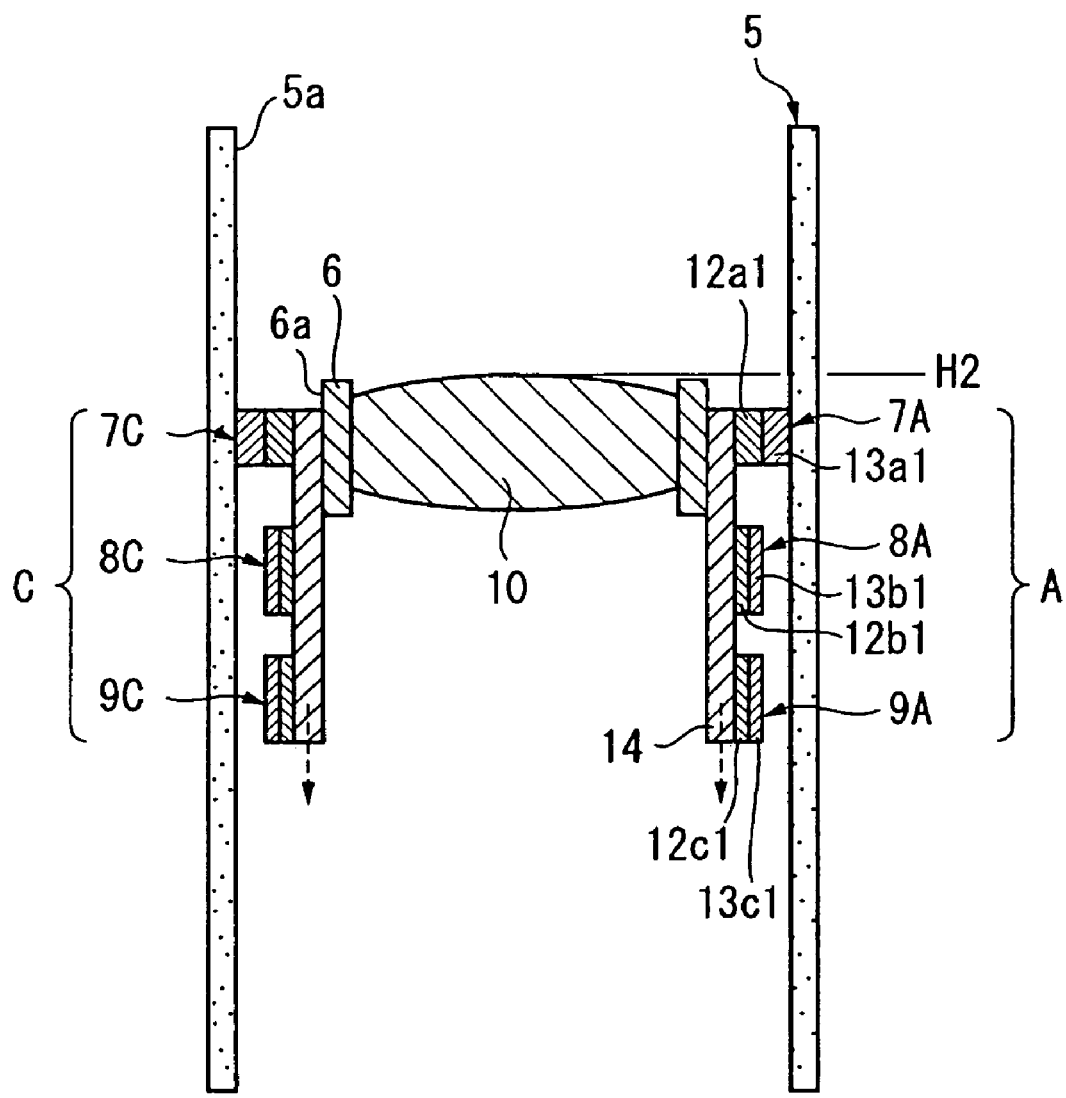
FIG. 5 is a sectional view similar to FIG. 2, showing a third operation state as one of a series of basic operations of the optical lens adjusting device.

FIG. 1 is a perspective view showing the appearance of a digital camera having an optical lens adjusting device according to the invention, in which FIG. 1A shows an accommodated state where a lens barrel is accommodated within a camera body, and FIG. 1B shows a protruding state where a lens barrel protrudes out of the camera body; FIG. 2 is a sectional view showing an initial state of a lens barrel part as a component part of the optical lens adjusting device; and FIGS. 3 to 6 are sectional views similar to FIG. 2, for explaining a series of basic operations of the optical lens adjusting device, in which FIG. 3 shows a first operation state, FIG. 4 shows a second operation state, FIG. 5 shows a third operation state, FIG. 6 shows a fourth operation state. Also, FIG. 7 is a partial plan view of an actuator shown in FIG. 2, as viewed from above, and FIG. 8 is a sectional view similar to FIG. 2, showing a state where a plurality of lenses are provided in the lens barrel.

A digital camera 1 shown in FIG. 1 is provided with a camera body 1A, a shutter 2, a lens driving mechanism (lens actuator) 3, a shielding cover 4, a strobo (electric flash), etc.

As shown in FIG. 2, the lens driving mechanism 3 includes a lens barrel 5, a holder (holding member) 6, a first driving member 7, a second driving member 8, a third driving member 9, etc. The digital camera 1 is adapted to be capable of being set to an accommodated state where the lens barrel 5 constituting the lens driving mechanism 3 is accommodated within the camera body 1A as shown in FIG. 1A, and to a protruding state where the lens barrel 5 protrudes outs of the camera body 1A. In addition, the inside of the camera body 1A is provided with an advancement and retreat driving means (not shown) that set the lens driving mechanism 3 to the accommodated state and the protruding state.

A base end of the lens driving mechanism 3 is provided with the shielding cover 4 and a cover driving means (not shown) for driving the shielding cover 4. In the accommodated state shown in FIG. 1A, the cover driving means is driven in a direction in which the shielding cover 4 is closed, thereby protecting a lens 10 provided at a leading end of the lens driving mechanism 3.

The lens barrel 5 that constitutes the lens driving mechanism 3 is cylindrical. The holder 6 moves vertically (first moving direction) in the lens barrel 5, and the holder 6 has a short barrel shape as shown in FIG. 7. As shown in FIG. 2, the lens 10 such as a convex lens, a concave lens or an aspheric lens is held in the holder 6. In other words, the lens 10 has its outer circumferential portion firmly fixed to the internal surface of the holder 6 by means of adhesive or the like.

As shown in FIGS. 2 and 7, a predetermined gap T1 is defined between the internal surface of the lens barrel 5 and the external surface of the holder 6. The first driving member 7, the second driving member 8 and the third driving member 9 are provided in the gap T1.

The first to third driving members 7, 8 and 9 is formed in the shape of a circular arc, and they are respectively provided with the predetermined gap T1 therebetween in a Z1–Z2 direction in the drawing that is the first moving direction.

The first to third driving members 7, 8 and 9 is composed of a short barrel-shaped common electrode 14 integrally provided over the entire periphery of at the external surface of the holder 6, three dielectric elastomers 12a, 12b and 12c provided with spacing T2 in the first moving direction on the external surface of the common electrode 14, and outside electrodes 13a, 13b and 13c respectively provided between the external surfaces of the three dielectric elastomers 12a, 12b and 12c and an internal surface 5a of the lens barrel 5.

As shown in FIG. 7, the dielectric elastomer 12a provided at the uppermost portion is composed of dielectric elastomers 12a1, 12a2, 12a3 and 12a4 which are divided into four in the circumferential direction. A predetermined regular pitch angle $\theta$ is defined between the respective dielectric elastomers 12a1, 12a2, 12a3 and 12a4. Similarly, the dielectric elastomer 12b at the intermediate stage also is composed of four dielectric elastomers 12b1, 12b2, 12b3 and 12b4 arranged at a predetermined regular pitch angle $\theta$ in the circumferential direction. Also, the dielectric elastomer 12c at the lowermost stage is composed of four dielectric elastomers 12c1, 12c2, 12c3 and 12c4 at a predetermined regular pitch angle $\theta$ in the circumferential direction.

The dielectric elastomer 12b1 is provided below the dielectric elastomer 12a1 and the dielectric elastomer 12c1 is provided below the dielectric elastomer 12b1. The spacing T2 is defined between the respective dielectric elastomers 12a1, 12b1 and 12c1. In addition, such relationship is also true of the other dielectric elastomers.

Each of the outside electrodes 13a, 13b and 13c also has a circular arc shape which is split into four pieces. The outside electrodes 13a1, 13a2, 13a3 and 13a4 are respectively fixed to the external surfaces of the dielectric elastomers 12a1, 12a2, 12a3 and 12a4, the outside electrodes 13b1, 13b2, 13b3 and 13b4 are respectively fixed to the external surfaces of the dielectric elastomers 12b1, 12b2, 12b3 and 12b4, and the outside electrodes 13c1, 13c2, 13c3 and 13c4 are respectively fixed to the dielectric elastomers 12c1, 12c2, 12c3 and 12c4.

Specifically, the first driving member 7 provided at the uppermost portion is composed of an X2-side driving part 7A composed of the common electrode 14, the dielectric elastomer 12a1, and the outside electrode 13a1; a Y2-side driving part 7B composed of the common electrode 14, the dielectric elastomer 12a2, and the outside electrode 13a2; and an X1-side driving part 7C composed of the common electrode 14, the dielectric elastomer 12a3, and the outside electrode 13a3; and the Y1-side driving part 7B composed of the common electrode 14, the dielectric elastomer 12a4, and the outside electrode 13a4.

Similarly, the second driving member 8 provided at the intermediate stage is composed of an X2-side driving part 8A composed of the common electrode 14, the dielectric elastomer 12b1, and the outside electrode 13b1; a Y2-side driving part 8B composed of the common electrode 14, the dielectric elastomer 12b2, and the outside electrode 13b2; and an X1-side driving part 8C composed of the common electrode 14, the dielectric elastomer 12b3, and the outside electrode 13b3; and the Y1-side driving part 8D composed of the common electrode 14, the dielectric elastomer 12b4, and the outside electrode 13b4. Also, the second driving member 9 provided at the lowermost stage is composed of an X2-side driving part 9A composed of the common electrode 14, the dielectric elastomer 12c1, and the outside electrode 13c1; a Y2-side driving part 9B composed of the common electrode 14, the dielectric elastomer 12c2, and the outside electrode 13c2; and an X1-side driving part 9C composed of the common electrode 14, the dielectric elastomer 12c3, and the outside electrode 13c3; and the Y1-side driving part 9D composed of the common electrode 14, the dielectric elastomer 12c4, and the outside electrode 13c4.

Also, the driving parts 7A, 8A and 9A which are lined up with the predetermined spacing T2 in the first moving direction at positions on X2-side constitute the driving means A; the driving parts 7B, 8B and 9B which are lined up in the first moving direction at positions on Y2-side constitute the driving means B; the driving parts 7C, 8C and 9C which are lined up in the first moving direction at positions on X2-side constitute the driving means C; and the driving parts 7D, 8D and 9D which are lined up in the first moving direction at positions on Y1-side constitute the driving means D.

In addition, although the above embodiment has been described about a construction in which each of the first to third driving members 7, 8 and 9 are split into four to constitute four driving means A, B, C and D, the invention is not limited thereto, but it may be configured to have much more driving means.

In addition, although the above embodiment has been described about a construction in which the holder 6 that holds the lens 10 is fixed to the external surface of the common electrode 14 at a height position that faces the first driving member 7 mainly composed of the driving parts 7A, 7B, 7C and 7D, and nothing is provided at positions that face the second driving member 8 and the third driving member 9, a holder 6c that faces mainly the third driving member 9 may be further provided, as shown in FIG. 2.

As shown in FIG. 2, an image pickup device 19, such as a CCD (Charge-Coupled Device) or a CMOS (Complementary Metal Oxide Semiconductor), is disposed in a lower portion in the camera body 1A. The image pickup device 19 is fixed in a state where it is positioned such that its center 19a coincides with an imaginary central line O—O that passes through the center of the lens barrel 5. In other words, the imaginary central line O—O that passes through the center of the image pickup device 19 becomes a reference optical axis of the lens barrel 5 and the lens 10. In addition, the image pickup device 19 has a function of converting an optical signal about an image of a photographic subject, etc. acquired via the lens 10 into an electric signal.

As described above, each of the driving means A, B, C and D is composed of the dielectric elastomers 12a, 12b and 12c, the outside electrodes 13a, 13b and 13c, and the common electrode 14. Each of the driving means A, B, C and D which are lined up in the first moving direction (Z-direction) constitutes one conductive high-polymer actuator (hereinafter referred to as an artificial muscle).

Specifically, the respective dielectric elastomers 12a, 12b and 12c that constitute the artificial muscle are formed of a plastic material, such as silicon resin or acrylic resin, having electrical responsiveness and excellent ductility. Further, the respective outside electrodes 13a, 13b and 13c and the common electrode 14 are formed of a material having excellent stretchability, for example, a flexible high-polymer material into which conductive carbon particles are blended.

For instance, the X2-side driving means A as shown in FIG. 2 will be described as an example. The driving part 7A of the driving means A has the outside electrode 13a1 and the common electrode 14. When a predetermined voltage is applied between these electrodes, an electric field is generated between the outside electrode 13a1 and the common electrode 14. Thus, negative charges are accumulated at one electrode, and positive charges are accumulated at the other electrode. In this state, an electrostatic attraction (a Maxwell stress) which attracts each other is generated between the outside electrode 13a1 and the common electrode 14 which faces each other. At this time, the dielectric elastomer 12a1 provided between the electrodes is crushed in its thickens direction (in the radial direction in FIG. 2) by the electrostatic attraction. In other words, the dielectric elastomer 12a1 is deformed such that it expands so as to spread in an in-plane direction parallel to a surface on which the common electrode 14 and the outside electrode 13a1 are formed, and it contracts in the film thickness direction orthogonal to the in-plane direction.

Further, when the application of a voltage stops, the dielectric elastomer 12a1 returns its original state. At this time, with the stop of the application of a voltage, the dielectric elastomer 12a1 in the crushed state is deformed such that it expands in the film thickness direction, and at the same time, it contracts in the in-plane direction. In addition, the operation of the driving part 7A that accompanies the application of a voltage is also true of the other driving parts 8A, 8C, etc.

The artificial muscle has an elastic force like rubber and has a significantly large expansion and contraction ratio and a high driving force, as compared to an existing actuator. Moreover, it is possible to use the artificial muscle as a driving means in a space that has a high degree of freedom in structure and is significantly small.

Next, a series of basic operations of the actuator having the first to third driving means will be described referring to FIGS. 2 to 6. In addition, although the following description will be made of, mainly, the driving means A, it is also true of the other driving means B, C and D.

The state (initial state) shown in FIG. 2 is a state where a voltage is not applied between the outside electrodes 13a1, 13b1 and 13c1 and the common electrode 14 that constitute the driving means A. In other words, the respective dielectric elastomers 12a1, 12b1 and 12c1 that constitute the driving means A are in a state where they do not contract in the thickness direction (a state where they do not expand in the in-plane direction) and in a state where they press the internal surface 5a of the lens barrel 5 outwardly (in the radial direction that gets away from the imaginary central line O—O) and presses the external surface 6a of the holder 6 inwardly (in the radial direction that gets closer to the imaginary central line O—O). Since this is also true of the other driving means B, C and D, the holder 6 is firmly held in the internal surface 5a of the lens barrel 5 at the position shown in FIG. 2 without falling down.

Next, an operation shifted from the initial state in FIG. 2 to the first operation state will be described.

In FIG. 3, a voltage is applied between the outside electrodes 13a and 13b and the common electrode 14 which constitute the driving means A. Thereby, the dielectric elastomers 12a1 and 12b1 constituting the driving means A is crushed in the radial direction that gets closer to the imaginary central line O—O, in a second moving direction orthogonal to the first moving direction (Z1–Z2 direction in the drawings) of the holder 6 by the electrostatic attraction. As a result, as shown in FIG. 3, the outside electrode 13a1 and the outside electrode 13b1 is separated from the internal surface 5a of the lens barrel 5. This releases the pressing state between the external surface 6a of the holder 6 and the internal surface 5a of the lens barrel 5 by the driving part 7A and the driving part 8A.

On the other hand, a voltage is not applied between the outside electrode 13c1 and the common electrode 14 that constitute the driving part 9A of the driving means A. The driving part 9A is still in a state where it presses the external surface 6a of the holder 6 and the internal surface 5a of the lens barrel 5, and the holder 6 is maintained in a state where it is held in the lens barrel 5 by the pressing state of the driving part 9A.

At the same time, in the state in FIG. 3, the respective dielectric elastomer 12a1 and 12b1 that constitutes the driving part 7A and the driving part 8A causes the outside electrodes 13a1 and outside electrode 13b1 and the common electrode 14 to stretch in the first moving direction (Z1–Z2 direction in the drawing).

At this time, the driving part 9A that is in the lower portion as seen from the driving part 7A and the driving part 8A presses the external surface 6a of the holder 6 and the internal surface 5a of the lens barrel 5, and the holder 6 is in a state where it is constrained in a portion below the driving part 8A. Thus, as shown in FIG. 3, when a voltage is applied to the driving part 7A and the driving part 8A, the respective dielectric elastomers 12a1 and 12b1, the respective outside electrodes 13a1 and outside electrode 13b1, and the common electrode 14 extends upward in the drawing (Z1 direction in the drawing) (see a dotted-line arrow shown in FIG. 3).

As the common electrode 14 stretches upward in the drawing, a portion of the holder 6 which is provided at a position corresponding to the first driving member 7 (driving parts 7A, 7B, 7C and 7D) in the holder 6 joined to the common electrode 14 is moved upward in the drawing (Z1 direction in the drawing).

In FIG. 3, reference numeral H0 represents an uppermost position of the lens 10 which is held in the holder 6 in the initial state shown in FIG. 2, and reference numeral h0 represents a position at a lower end of the third driving member 9 (driving parts 9A, 9B, 9C and 9D) in the initial state shown in FIG. 2. In the first operation in FIG. 3, as the holder 6 moves upward in the drawing, the uppermost position of the lens 10 move upward to a height position H1, but the lower end of the driving part 9C is maintained at the same height position H0 as that in the initial state.

Next, an operation shifted from the first operation state shown in FIG. 3 to a second operation state shown in FIG. 4 will be described.

As shown in FIG. 4, when the application of a voltage to the outside electrode 13a1 and the common electrode 14 that constitutes the driving part 7A of the driving means A stops, the dielectric elastomer 12a1 of the driving part 7A returns to its original state. Thereby, since the outside electrode 13a1 of the driving means A abuts on the internal surface 5a of the lens barrel 5, the driving part 7A is again set to the state where it presses the external surface 6a of the holder 6 and the internal surface 5a of the lens barrel 5. At this time, the dielectric elastomer 12a1, the outside electrode 13a1, and the common electrode 14 contracts in the first moving direction (Z1–Z2 direction in the drawing). However, since the driving part 9A below the driving part 7A is maintained in a constrained state, the dielectric elastomer 12a1 and the outside electrode 13a1 that constitute the driving part 7A contracts downward in the drawing, and the common electrode 14 which is at a position joined to a lateral face of the dielectric elastomer 12a1 of the driving part 7A also contracts downward in the drawing (see a dotted-line arrow). As a result, the holder 6 which is provided at a position facing the driving part 7A is also slightly moved (see a solid-line arrow), and the upper height position of the lens 10 goes down from H1 to H2.

However, in the second operation state shown in FIG. 4, the dielectric elastomer 12b1 of the driving part 8A, a middle portion of the common electrode 14 in the first moving direction (Z1 direction), and the outside electrode 13b1 are still maintained in the state where they stretch upward in the drawing that is the first moving direction). Thus, the uppermost height position H2 of the lens 10 is maintained at a position higher than the height position H0 in the initial state by the stretched distance.

Next, an operation shifted from the second operation state shown in FIG. 4 to a third operation state shown in FIG. 5 will be described.

In the third operation state shown in FIG. 5, a voltage is applied between the outside electrode 13c1 of the driving part 9A and the common electrode 14. Thereby, the dielectric elastomer 12c1 of the driving part 9A is crushed in the second moving direction (radial direction that gets closer to the imaginary central line O—O) orthogonal to the first moving direction (Z1–Z2 direction in the drawing) of the holder 6 by an electrostatic attraction). As a result, the outside electrode 13c1 of the driving part 9A is separated from the internal surface 5a of the lens barrel 5, thereby releasing the pressing state between the external surface 6a of the holder 6 and the internal surface 5a of the lens barrel 5 by the driving part 9A.

At the same time with the releasing, the dielectric elastomer 12c1 of the driving part 9A stretches in the first moving direction of the holder 6. However, since the driving part 7A above the driving part 9A presses the external surface 6a of the holder 6 and the internal surface 5a of the lens barrel 5 and the holder 6 is in a state where it is constrained above the driving part 9A, the dielectric elastomer 12c1 of the driving part 9A stretches downward in the drawing. As a result, the common electrode 14 located on the inner circumferential surface of the dielectric elastomer 12c1 of the driving part 9A and the outside electrode 13c1 of the driving part 9A also stretches downward in the drawing (see an arrow direction shown by a dotted line).

Next, an operation shifted from the third operation state shown in FIG. 5 to a fourth operation state shown in FIG. 6 will be described.

In the fourth operation state shown in FIG. 6, the application of a voltage between the outside electrode 13c1 and the common electrode 14 that constitute the driving part 9A and between the outside electrode 13b1 and the common electrode 14 that constitute the driving part 8A stops. Thereby, the dielectric elastomers 12b1 and 12c1 that respectively constitute the driving part 8A and the driving part 9A contract together in the first moving direction (Z1–Z2 direction in the drawing) of the holder 6. However, since the driving part 7A located above the driving part 8A and the driving part 9A presses the external surface 6a of the holder 6 and the internal surface 5a of the lens barrel 5, and the holder 6 is in a state where it is constrained above the driving part 8A and the driving part 9A. Therefore, the dielectric elastomers 12b1 and 12c1 that respectively constitute the driving part 8A and the driving part 9A contract upward in the drawing. As a result, the middle portion and the lower end of the common electrode 14 joined to the inner circumferential surface of the dielectric elastomers 12b1 and 12c1 of the driving part 8A and the driving part 9A contract upward in the drawing (see an arrow direction shown by a dotted line);

In the fourth operation state shown in FIG. 6, when the application of a voltage to the driving part 8A and the driving part 9A stops, the dielectric elastomers 12b1 and 12c1 expand in the second moving direction (X1–X2 direction in the drawing) orthogonal to the first moving direction (Z1–Z2 direction in the drawing) so as to return to their original states, and the outside electrodes 13b1 and 13c1 that constitute the driving part 8A and the driving part 9A abut on the internal surface 5a of the lens barrel 5, thereby setting a pressing state where the driving part 8A and the driving part 9A press the external surface 6a of the holder 6 and the internal surface 5a of the lens barrel 5. As a result, the driving means A that is constituted of the driving parts 7A, 8A and 9A returns to the initial state shown in FIG. 2, as the third operation state of the lens driving mechanism (lens actuator) 3.

The driving means A, B, C and D can be independently driven, respectively. Also, by causing the driving means A, B, C and D to repeatedly carry out the series of operations described referring to FIGS. 2 to 6, the holder 6 can be continuously moved upward by a predetermined height (height position H2—height position H0).

Further, in a case where the holder 6 is intended to move downward, it is possible to continuously move the holder 6 downward by sequentially repeating the operations in FIGS. 5, 4, 3 and 6 from the state in FIG. 2.

In the invention, it is possible to move the holder 6 in the first moving direction by using the artificial muscle having a high expansion and contraction ratio, in which the plurality of driving means A, B, C and D are constituted of the dielectric elastomer 12 and the expandable and contractable outside electrode 13 and common electrode 14 on both sides of the dielectric elastomer 12 and by repeating the serious of operations.

Accordingly, for example, when a lens assembling work is carried out, the holder 6 having the lens 10 can be moved to a predetermined position in the lens barrel 5 by mounting the holder 6 which holds the lens 10 and the lens driving mechanism (actuator) 3 having the driving means A, B, C and D provided in the holder 6 on one end of the lens barrel 5, then applying a predetermined voltage at a predetermined timing between the respective outside electrodes 13a, 13b and 13c and the common electrode 14 of the respective driving parts, and continuously carrying out the series of operations shown in FIGS. 2 to 6.

Next, a method of installing the holder 6, which is moving in the first moving direction, at a certain position in the lens barrel 5 will be described.

As shown in FIG. 7, gaps S1, S2, S3 and S4 are formed between the internal surface 5a of the lens barrel 5 and the common electrode 14, and between the respective driving means A, B, C and D arranged at a predetermined pitch angle θ in the circumferential direction. Thus, for example, as shown in FIG. 7, a convex stopper 5b (5b1, 5b2 and 5b3) is formed on the internal surface 5a of the lens barrel 5, and the convex portion 14a is formed on the external surface of the common electrode 14 such that the gap S2 between the driving means B and the driving means C. At this time, the stopper 5b which is formed to protrude inward from the internal surface 5a of the lens barrel 5 is formed at a certain height position (a position intended to be holder 6) in the lens barrel 5, and the stopper 5b and the convex portion 14a are set to a protrusion dimension that they abut on each other. In this state, when the holder 6 is moved in the first moving direction, the convex portion 14a at the holder 6 can be allowed to abut on the stopper 5b at the lens barrel 5, and the holder 6 can be prevented from further moving in the first moving direction.

Further, in a construction in which a plurality of the lenses are accommodated within the lens barrel 5, it is possible to stop holders 6 holding the respective lenses at certain positions by forming the convex portion 14a on the external surface of each of the holders 6 and by forming the stopper 5b at the position intended to fix the holder corresponding to each of the gaps S1 to S4.

For example, as shown in FIG. 8, in a construction in which a holder 6A having a convex lens 10A, a holder 6B having a concave lens 10b, and a holder 6C having an aspheric lens 10C are arranged in the lens barrel 5, three types of stoppers 5b1, 5b2 and 5b3 are respectively formed on the internal surface 5a of the lens barrel 5 at different height positions. For example, the stoppers 5b1, 5b2 and 5b3 are respectively provided at the height positions corresponding to the gaps S1 to S4 such that the stopper 5b1 is provided at a height position h1 corresponding to the gap S1, the stopper 5b2 is provided at a height position h2 corresponding to the gap S2, and the stopper 5b3 is provided at a height position h3 corresponding to the gap S3.

Each of the holders 6A, 6B and 6C is provided with the actuator composed of driving means A, B, C and D, and convex portions 14a, 14b, 14c and 14d are respectively formed at the positions, corresponding to the gaps S1 to S4, on the external surface of the respective holders 6.

Thus, the respective holders 6A, 6B and 6C are sequentially mounted on the end of lens barrel 5, and respectively moved in the first moving direction by driving the driving means A, B, C and D, so that the holder 6A can be stopped optionally at a position Ha, the holder 6B can be stopped optionally at a position Hb, and the holder 6C can be stopped optionally at a position Hc. Therefore, the distance between one upper lens and the other lower lens can be set to a predetermined facing distance. From this point, the stoppers 5b1, 5b2 and 5b3 formed corresponding to the respective height positions function as address projections for setting the respective lens 10 at predetermined height positions. Thus, it is possible to carry out the lens assembling work that fixes a plurality of lenses in the lens barrel 5.

Meanwhile, in the invention, the position of each holder 6 in the first moving direction in the lens barrel 5 can be detected, for example, on the basis of a change in capacitance of the first driving member 7 (driving parts 7A, 7B, 7C and 7D).

As such means, it is preferable that projection be formed on the internal surface 5a of the lens barrel 5 at predetermined intervals in the first moving direction (Z1–Z2 direction) according to a predetermined arrangement (address arrangement) within movable ranges (paths) corresponding to the driving parts 7A, 7B, 7C and 7D.

For example, in a case where the holder 6C is disposed at the certain position Hc, a projection is formed at only the position corresponding to the driving part 7D on the certain position Hc, and any protrusion is not formed at the positions corresponding to the driving parts 7A, 7B and 7C. Further, in a case where the holder 6B is disposed at the certain position Hb, projections are respectively formed at the positions corresponding to the driving parts 7C and 7D on the certain position Hb, and any protrusion is not formed at the positions corresponding to the driving parts 7A and 7B. Moreover, in the case of the holder 6A, projections are respectively formed at the positions corresponding to the driving parts 7B, 7C and 7D on the certain position Ha, and any projection is not formed at the position corresponding to the driving part 7A.

With such arrangement, the address of the certain height position Hc can be regarded as "0001", the address of the certain height position Hb can be regarded as "0011", and the address of the certain height position Ha can be regarded as "0111".

In this state, if the driving means A, B, C and D are driven to move the respective holders 6 in the first moving direction, the driving parts 7A, 7B, 7C and 7D rides on the projections formed at the certain positions Ha, Hb and Hc when they arrive at the positions.

At this time, the driving part 7D rides on the projection at the certain height position Hc (its address is "0001"). At this time, the dielectric elastomer 12a1 is deformed to alter the distance between the outside electrode 13a1 and the common electrode 14 which faces each other. Thus, the capacitance between the outside electrode 13a4 and the common electrode 14 that constitute the driving part 7D varies, but the capacitance between the outside electrodes 13a1, 13a2 and 13a3 and the common electrode 14 that constitute the other driving parts 7A, 7B and 7C does not change.

Similarly, at the certain height position Hb (its address is "0011"), the capacitance between the outside electrodes 13a3 and 13a4 and the common electrode 14 that constitute the driving parts 7C and 7D varies, but the capacitance between the outside electrodes 13a1 and 13a2 and the common electrode 14 that constitute the other driving parts 7A and 7B does not change. Further, at the certain height position Ha (its address is "0111"), the capacitance between the outside electrode 13a2, 13a3 and 13a4 and the common electrode 14 that constitute the driving parts 7B, 7C and 7D varies, but the capacitance between the outside electrode 13a1 and the common electrode 14 that constitute the other driving part 7A does not change.

Therefore, by detecting a voltage change based on the changes in capacitance of the respective driving parts 7A, 7B, 7C and 7D, it is possible to detect whether the respective holders 6A, 6B and 6C reach the corresponding certain positions Ha, Hb and Hc. Thus, by stopping supply of voltages applied to the respective driving means A, B, C and D disposed in the respective holders 6A, 6B and 6C when the respective holders 6A, 6B and 6C reach the certain positions Ha, Hb and Hc, respectively, it is possible to the holders 6A, 6B and 6C at the certain positions Ha, Hb and Hc, respectively.

As such, the plurality of projections formed on the internal surface 5a of the lens barrel 5 function as the address projections which stop the holders 6A, 6B and 6C at the certain positions Ha, Hb and Hc.

Figure 9A:
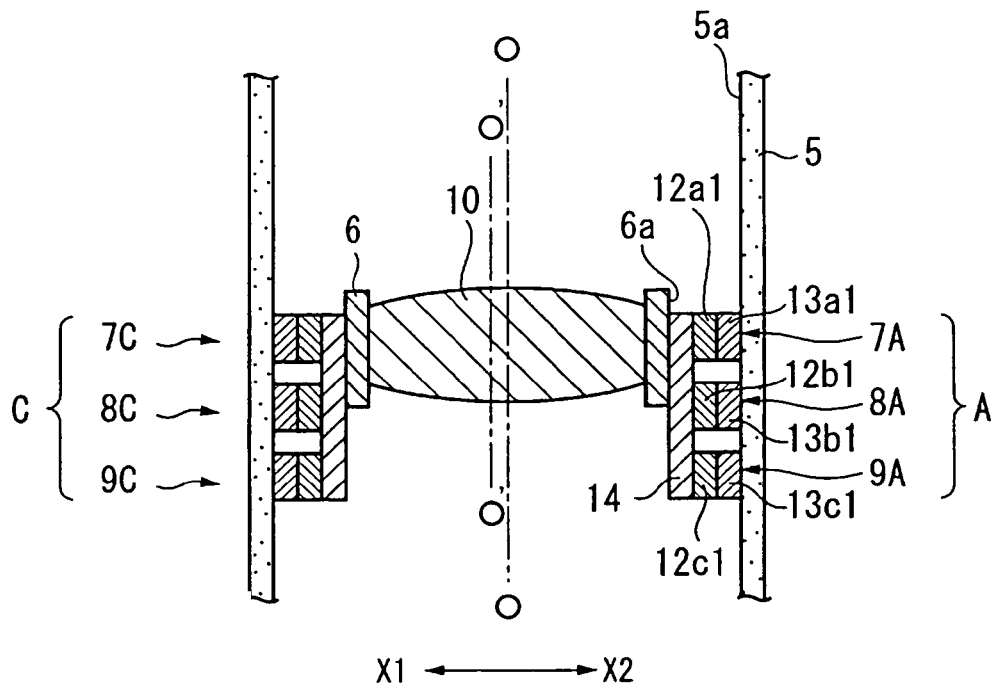
FIG. 9A shows a state before alignment in which the optical axis of the lens deviates slightly from a reference optical axis.
Figure 9B:
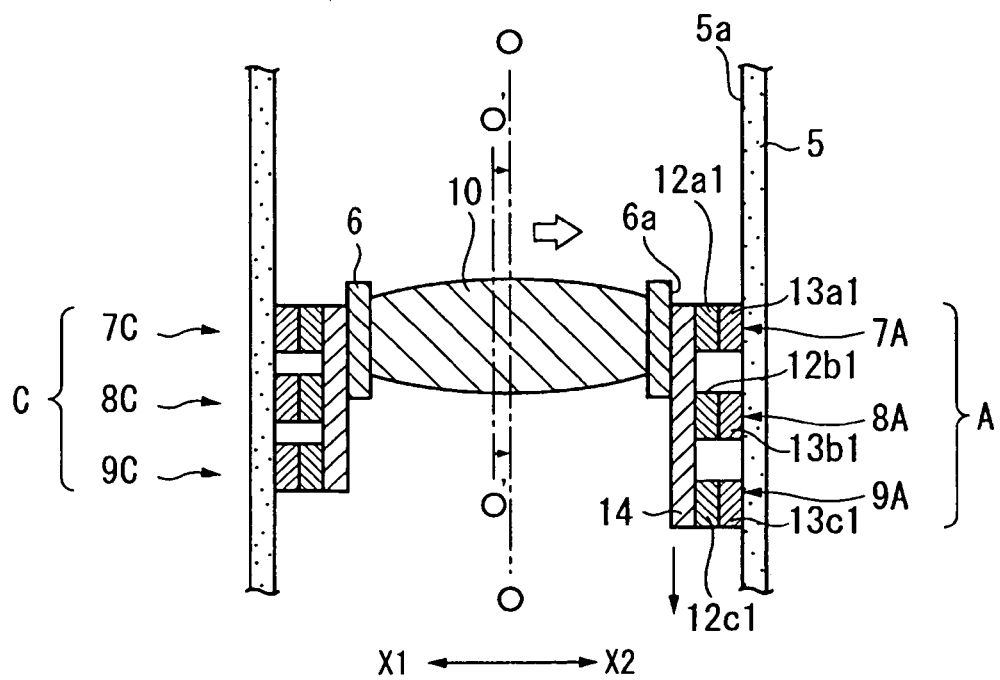
FIG. 9B shows a state after the alignment.

Next, alignment of an optical axis of a lens will be described. FIG. 9 is a sectional view similar to FIG. 2, showing a method of aligning an optical axis of a lens, in which FIG. 9A shows a state before alignment in which the optical axis of the lens deviates slightly from a reference optical axis, and FIG. 9B shows a state after the alignment. In addition, FIGS. 9A and 9B show a state where an optical axis O'—O' of a lens slightly deviates in the X1-direction from the reference optical axis O—O while maintaining a state parallel thereto.

As described above, in an initial set state (a state before supply of power to the digital camera 1) in which each of the driving means A, B, C and D is driven to stop a holder 6 at a certain position, slight clearance exists between the holder 6 after the movement and the lens barrel 5, and slight clearance also exists between the outer circumference of the lens 10 and the internal surface of the holder 6. Therefore, as shown in FIG. 9, the optical axis O'—O' of the lens 10 often deviates slightly from the reference optical axis (imaginary central line O—O).

In this case, for example, a voltage is applied between the outside electrodes 13a1, 13b1 and 13c1 and the common electrode 14 that constitute the respective driving parts 7A, 8A and 9A of the driving means A which is located opposite to the X1-direction as the deviation direction of the optical axis O'—O' of the lens 1. As shown in FIG. 9B, this causes the respective dielectric elastomers 12a1, 12b1 and 12c1 provided in the driving parts 7A, 8A and 9A to be slightly deformed in the direction that they are crushed in the X1–X2 direction, thereby slightly moving the entire holder 6 holding the lens 10. As a result, the optical axis O'—O' of the lens 10 can be made coincide with or get closer to the reference optical axis O—O.

In addition, in a case where the deviation direction of the optical axis O'—O' is, for example, a direction between the X1-direction and a Y2-direction, both the driving means A and the driving means D are driven. This causes the entire holder 6 holding the lens 10 to be moved in the direction between the X2-direction and the Y2-direction. As a result, the optical axis O'—O' of the lens 10 can be made coincide with or get closer to the reference optical axis O—O.

Next, optical axis tilt adjustment of a lens will be described. FIG. 10 is a sectional view similar to FIG. 2, showing a method of adjusting tilt of the optical axis of the lens, in which FIG. 10A shows a state before adjustment in which the optical axis of the lens is tilted by a tilt angle φ from the reference optical axis, and FIG. 10B shows a state after the adjustment.

Figure 10A:
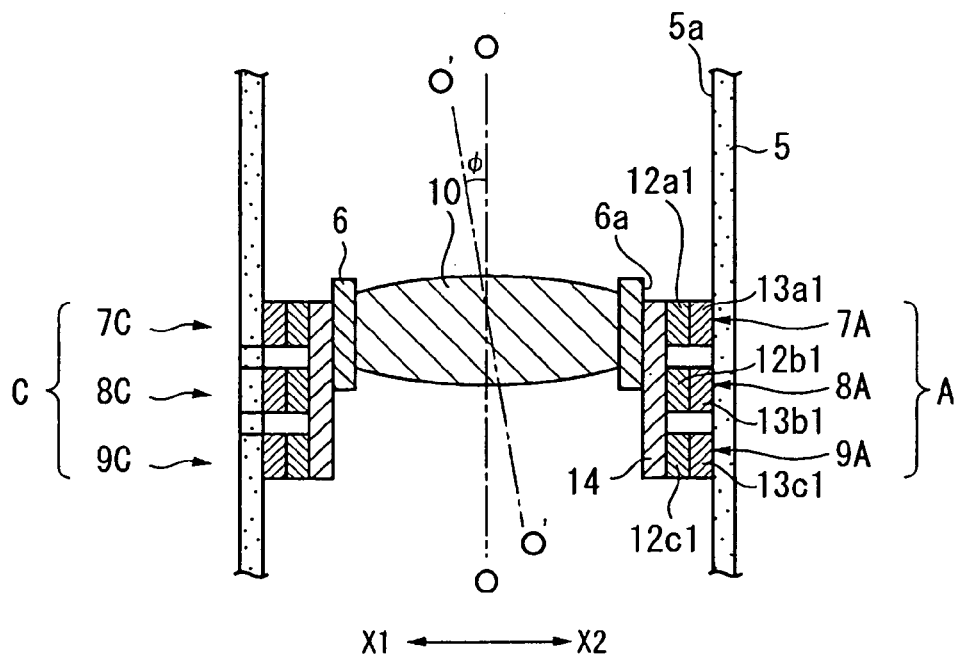
FIG. 10A shows a state before adjustment in which the optical axis of the lens is tilted by a tilt angle φ from the reference optical axis.

Further, in the initial set state, due to the influence of the clearance, as shown in FIG. 10A, the optical axis O'—O' of the lens 10 is set to a state where it is slightly tilted from the reference optical axis (imaginary central line O—O) by a tilt angle φ.

Figure 10B:
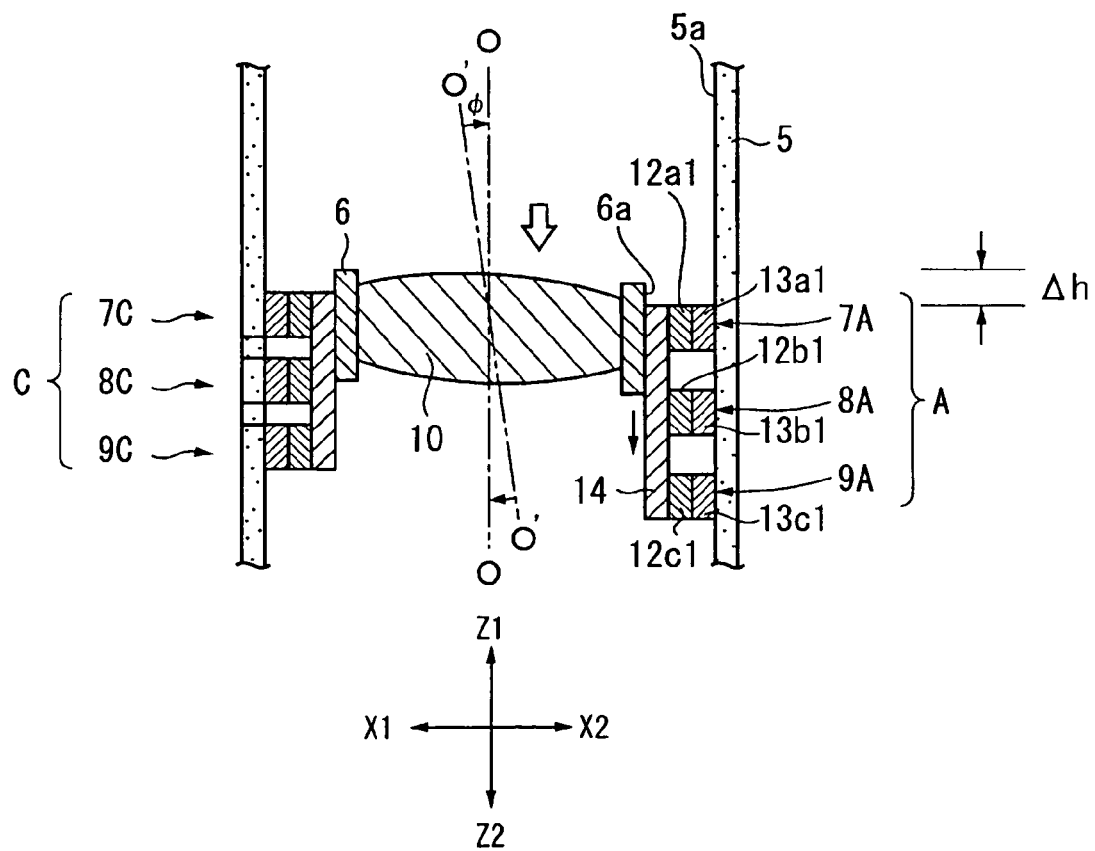
FIG. 10B shows a state after the adjustment.

In such a case, any of the driving parts located in the inclined direction, for example, the driving parts 7A, 8A and 9A that constitute the driving means A located on the X2-side of the holder 6 in the embodiment shown in FIGS. 10A and 10B, is driven. This causes only the X2-side of the holder 6 to be moved slightly in the direction of an arrow (Z2-direction in the drawing) by Δh, thereby rotating the entire holder 6 holding the lens 10 slightly in the clockwise direction. As a result, the optical axis O'—O' of the lens 10 can be made coincide with or get closer to the reference optical axis O—O.

Next, a specific method of the optical axis alignment and optical axis tilt adjustment of a lens will be described.

Figure 11:
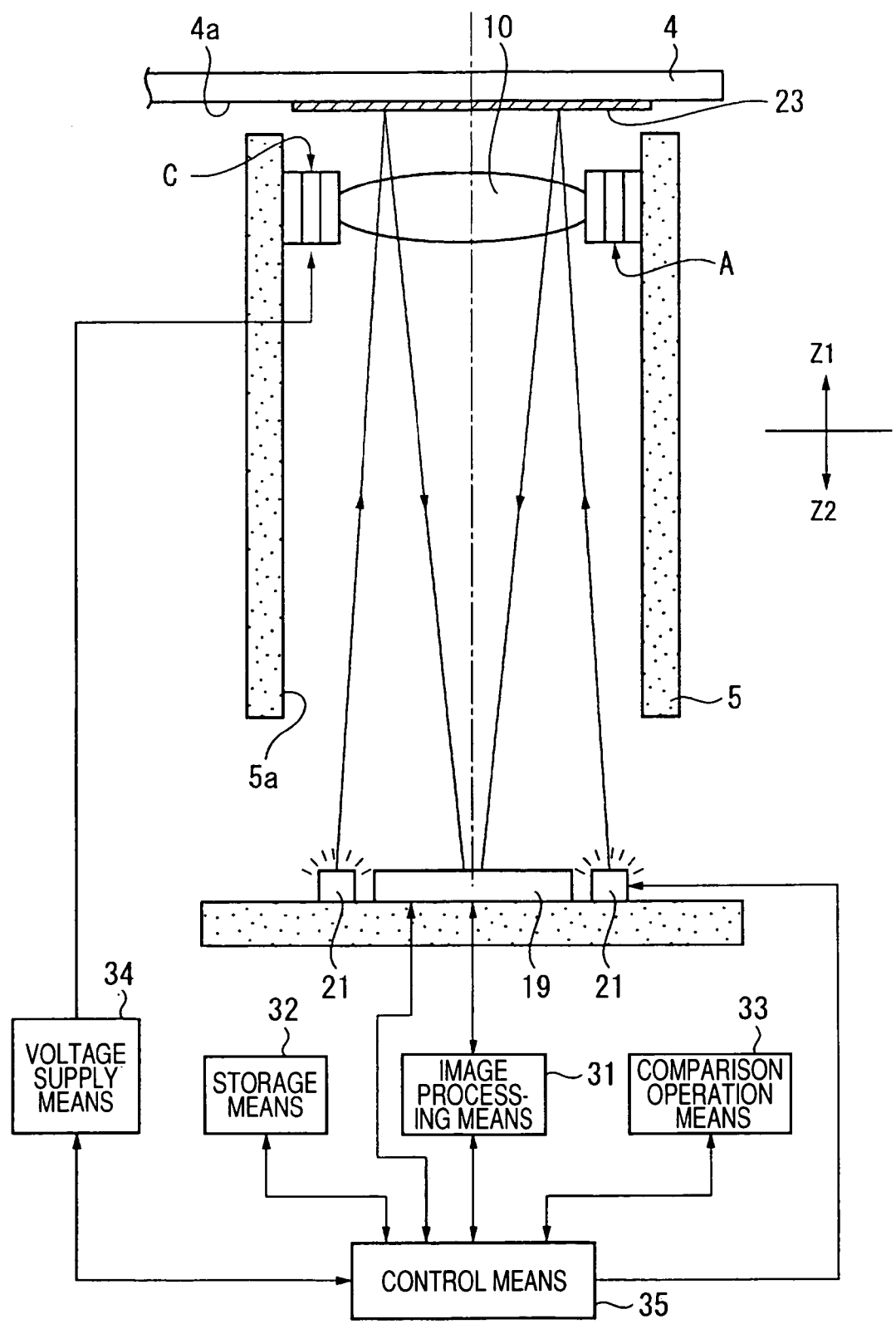
FIG. 11 is a block chart showing the construction of the optical lens adjusting device according to the invention.

FIG. 11 is a block chart showing the construction of the optical lens adjusting device according to the invention.

First, referring to FIG. 11, the construction of an optical lens adjusting device will be described. As shown in FIG. 11, a plurality of light sources 21 are provided in the vicinity of the image pickup device 19 in the camera body 1A. An adjustment chart 23 is provided at the position facing the lens 10 at the leading end of the lens barrel 5, specifically on an internal surface 4a of the shielding cover 4. The adjustment chart 23, for example, is configured to have a mirror provided as a base on the side of the shielding cover 4 and a contrast detecting pattern formed in a predetermined shape on the surface of the mirror.

The inside of the camera body 1A is provided with an image processing means 31 which performs predetermined image processing on the image data acquired by the image pickup device 19; a storage means 32 which stores and holds set data for adjustment or other data (contrast values, etc.) for setting the state of the optical axis of each lens 10 from the initial set state before supply of power, in which the optical axis of the lens does not coincide with the reference optical axis O—O, to the state where the optical axis of the lens coincides with or gets closer to the reference optical axis O—O; a comparison operation means 33 which compares a portion of the image data detected by the image processing means 31 with the data stored in the storage means 32; a voltage supply means 34 which generates a predetermined voltage and applies it between the respective electrodes that constitute the driving means A, B, C and D constituting the actuator; and a control means 35 which controls setting, such as timing of application of a voltage output by the voltage supply means 34 or timing when the optical sources 21 is allowed to emit light, and control of the respective means.

Hereinafter, an adjusting method using the set data for adjustment with respect to the initial set state will be described.

First, a method of acquiring the set data for adjustment that set the optical axis of a lens to the reference optical axis will be described.

In a first assembling process of the digital camera 1, the control means 35 controls a voltage output from the voltage supply means 34 to be applied to the respective electrodes of the driving means A, B, C and D at a predetermined timing to cause the driving means A, B, C and D to perform the series of operations, thereby continuously moving each holder 6 holding the lens 10 to a predetermined position. In addition, in this state, the lens barrel 5 is in a state where it is accommodated within the camera body 1A, and the shielding cover 4 is set to a closed state.

Next, the control means 35 controls the light sources 21 to be turned on. The light emitted from the light sources 21 travels in the lens barrel 5 in the Z1 direction that is the first moving direction, is transmitted through the lens 10, and is then illuminated onto the adjustment chart 23. Further, the light is reflected by a mirror provided in the adjustment chart 23, transmitted through the lens 10 in the opposite direction to the above direction, travels in the lens barrel 5 in the Z2-direction, and then reaches the image pickup device 19. At this time, the contrast detecting pattern provided in the adjustment chart 23 is focused on the image pickup device 19.

The control means 35 uses the image pickup device 19 and the image processing means 31 freely, whereby contrast values are detected corresponding to the image data of the contrast detecting pattern therefrom and the contrast values are stored in the storage means 32.

Next, the control means 35 acquires the contrast values in a state after a predetermined voltage is applied to each combination of the electrodes respectively provided in the driving means A, B, C and D or in a state after the application of the voltage has stopped, in other words, the contrast values to be output whenever the respective driving part performs different kinds of driving.

For example, when a predetermined voltage is applied between the outside electrode 13a1 and the common electrode 14 that constitute the driving part 7A of the driving means A, the control means acquires the contrast values after the driving part 7A of the driving means A is driven. Next, when a predetermined voltage is applied between the outside electrode 13b1 and the common electrode 14 that constitute the driving part 7B of the driving means A, the control means acquires the contrast values after the driving part 7B of the driving means A. Further, when the application of the voltage applied between the outside electrode 13a1 and the common electrode 14 that constitute driving part 7A of the driving means A stops, recovering its original state, the control means acquires the contrast values after the recovery. The acquired data is stored in the storage means 32. In brief, the control means acquires detailed corresponding contrast values for each driving part and each operation.

Also, the control means 35 determines an operating state where one of the contrast values becomes greatest among all operating states, by comparing the contrast values for the respective operations that is acquired in the above manner using the comparison operation means 33. The contrast value at that time and the set data for adjustment related to the application of a voltage applied to the respective electrodes for setting the operating state is stored in the storage means.

Next, an adjusting method after digital cameras are shipped will be described.

In the digital camera 1, the operating states of the driving means A, B, C and D that constitute the actuator can be set to the operating states corresponding to the set data for adjustment. However, the deviation amount and inclination angle (optical axis tile angle) φ of the optical axis O'—O' of the lens 10 with respect to the reference optical axis O—O corresponds to a minimum state.

For this reason, immediately after the digital camera 1 is powered on after the digital camera 1 is shipped, the control means 35 reads the set data for adjustment from the storage means 32, and actuates the driving means A, B, C and D on the basis of the set data for adjustment, so that the optical axis alignment and the optical axis tilt adjustment can be performed automatically.

Specifically, the light sources 21, the image processing means 31, the storage means 32, the comparison operation means 33, the driving means A, B, C and D, the voltage supply means 34, and the control means 35 constitute an optical lens adjusting means which automatically performs the optical axis alignment and optical axis tilt adjustment of the lens 10 of the digital camera 1 when the set data for adjustment is detected in advance and power is supplied to the digital camera 1.

The acquisition of the set data for adjustment is basically carried out as one task during assembling of the digital camera 1, and does not need to be carried out particularly except for the special cases (such as high temperature environment or low temperature environment) as described below.

In addition, as shown in FIG. 8, in the case of the construction in which the plurality of lens 10 are provided in the lens barrel 5, it is also possible to automatically carried out the optical axis alignment and optical axis tilt adjustment of each lens, similarly to the above, by using the above adjusting method freely.

Meanwhile, if digital cameras are placed in a low temperature environment or a high temperature environment that increases in temperature environment from the normal temperature, expansion or contraction occurs in the lens barrel 5 or the holder 6, which increases the clearance between the lens barrel and the holder. Therefore, the deviation amount and tilt angle (optical axis tile angle) φ of the optical axis O'—O' of the lens 10 with respect to the reference optical axis O—O also change.

In this case, similarly to the above, the adjusting means of the optical lens may be adapted to acquire set data for adjustment in the temperature environment.

Alternatively, a manufacturer may carry out temperature environment tests to acquire set data for adjustment for each temperature and then store the data in the storage means 32. In this case, the control means 35 reads set data for adjustment corresponding to each temperature, so that it is possible to optical axis alignment and optical axis tilt adjustment of the lens 10 corresponding to the temperature environment concerned.

In addition, the above embodiment has been described in conjunction with the case in which, when the digital camera 1 is powered off, the lens after adjustment returns to its original state where optical axis deviation and optical axis tilt occurs, whereas when the digital camera is again powered on, the lens is set to its optimized state after adjustment having little optical axis deviation and optical axis tilt. However, the invention is not limited thereto. For example, the lens may be fixed to its optimized state by coating a bonding agent in a power-on state, specifically, a state where the optical axis alignment and optical axis tilt adjustment of a lens at the time of shipment.

Further, although the above embodiment has been described about mainly digital cameras, the invention is not limited thereto, and it can be generally applied to electronic apparatuses with a camera, such as mobile telephones with a camera.

According to the aspects of the invention, optical axis alignment that moves the lens (or lenses) in a direction orthogonal to its optical axis, optical axis inclination adjustment that correct the inclination of the lens to correct the tilt of the optical axis, lens positioning that set the lens to a right position in the lens barrel by moving the lens in a direction parallel to the optical axis or that set the distance between the lenses to a right relative distance, etc. can be performed automatically with a simple construction.

Further, it is possible to perform the optical axis adjustment not only during assembling in a factory before shipment but also after the shipment. Therefore, it is possible to provide electronic apparatuses, such as cameras or mobile telephones with a camera, which have particularly a wide range of application with respect to changes in temperature environment.

What is claimed is:

1. An optical lens adjusting device that performs adjustment of at least one or more lenses provided in a lens barrel, comprising:
an actuator that actuates a lens in a first moving direction in which the lens barrel extends and in a second moving direction orthogonal to the first moving direction;
an adjustment chart that can be placed at a position facing the lens and has a predetermined detection pattern;
an image pickup device that is provided opposite to the adjustment chart with the lens therebetween to capture the adjustment chart as image data;
an image processing means that outputs contrast values obtained by image-processing the image data captured by the image pickup device;

a comparison operation means that compares the contrast values whenever the actuator; and a control means which causes the actuator to perform driving based on information from the comparison operation means.

2. The optical lens adjusting device according to claim 1, further comprising a storage means that stores an operating state of the actuator when one of the contrast values compared by the comparison operation means becomes greatest, wherein the control means controls the actuator on the basis of set data for adjustment stored in the storage means to perform positional adjustment of the lens.

3. The optical lens adjusting device according to claim 1, wherein a plurality of the actuators are provided between the outer periphery of the lens and the lens barrel, and the respectively actuators are independently driven so that the lens can be moved in the first moving direction.

4. The optical lens adjusting device according to claim 1, wherein, when an imaginary line passing through the center of the image pickup device is used as a reference optical axis, the actuator is driven so that the optical axis of the lens coincides with the reference optical axis.

5. The optical lens adjusting device according to claim 1, wherein a plurality of the lenses are provided in the lens barrel and the actuators are driven so that a predetermined facing distance is set between the one lens and another lens.

6. The optical lens adjusting device according to claim 1, further comprising a holding means that holds the outer periphery of the lens,
wherein the actuator is provided between an internal surface of the lens barrel and the holding means.

7. The optical lens adjusting device according to claim 1, wherein the actuator is a driving means in which a plurality of driving parts are provided at predetermined intervals in the first moving direction, and
each of the driving parts has a deformable dielectric elastomer, a pair of expandable and contractable electrodes which are arranged to face both sides of the dielectric elastomer.

8. The optical lens adjusting device according to claim 7, wherein one of the driving parts located opposite to the side to which the optical axis deviates is driven.

9. An optical lens adjusting method that performs adjustment of at least one or more lenses provided in a lens barrel, comprising the steps of:

setting a state of a lens to a different state on each occasion by driving an actuator provided with the lens in a first moving direction in which the lens barrel extends and in a second moving direction orthogonal to the first moving direction;

acquiring an image of an adjustment chart for every state of the lens with the image pickup device;

obtaining contrast values by image-processing data about the image captured by the image pickup device;

comparing the contrast values obtained whenever the image processing is performed on the data about the image; and driving the actuator so that one of the contrast values becomes greatest.

10. An optical lens adjusting method using the optical lens adjusting device according to claim 1, comprising the steps of:

acquiring set data for adjustment that sets an optical axis of a lens to a predetermined reference optical axis; and setting a state of the lens to an operating state based on the set data for adjustment read from the storage means immediately after power-on.

11. The optical lens adjusting method according to claim 10,
wherein the step of acquiring the set data for adjustment includes the steps of:

driving the actuator to the state of the lens to a different state on each occasion;

imaging the adjustment chart on the image pickup device with lens;

acquiring contrast values by image-processing data about an image captured by image pickup device; and comparing the contrast values acquired whenever the image processing is performed, on each occasion, to store an operating state showing a greatest contrast value as the set data for adjustment.

12. The optical lens adjusting method according to claim 11,
wherein, in the step of driving the actuator, the actuator is driven so that the optical axis of the lens coincides with the reference optical axis.

* * * * *